US012652689B2

(12) United States Patent
Abedini et al.

(10) Patent No.: US 12,652,689 B2
(45) Date of Patent: Jun. 9, 2026

(54) EXTENDED CROSS LINK INTERFERENCE MEASUREMENT AND REPORTING

(71) Applicant: QUALCOMM Incorporated, San Diego, CA (US)

(72) Inventors: Navid Abedini, Basking Ridge, NJ (US); Qian Zhang, Basking Ridge, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1007 days.

(21) Appl. No.: 17/647,811

(22) Filed: Jan. 12, 2022

(65) Prior Publication Data

US 2023/0239907 A1    Jul. 27, 2023

(51) Int. Cl.
H04W 72/541 (2023.01)
H04W 24/10 (2009.01)
H04W 74/0833 (2024.01)

(52) U.S. Cl.
CPC ......... H04W 72/541 (2023.01); H04W 24/10 (2013.01); H04W 74/0833 (2013.01)

(58) Field of Classification Search
CPC ............... H04W 72/541; H04W 24/10; H04W 72/23; H04W 72/0446; H04L 5/0057; H04L 5/006; H04B 17/345
See application file for complete search history.

(56) References Cited

U.S. PATENT DOCUMENTS

| | | | | |
|---|---|---|---|---|
| 10,477,420 | B2 * | 11/2019 | Ghosh | H04W 24/08 |
| 12,021,663 | B2 * | 6/2024 | Kang | H04L 5/0073 |
| 2021/0274506 | A1 * | 9/2021 | Raghavan | H04W 72/541 |
| 2021/0392530 | A1 * | 12/2021 | Shi | H04W 72/23 |
| 2022/0015143 | A1 * | 1/2022 | Tiirola | H04W 72/0446 |
| 2022/0061117 | A1 * | 2/2022 | Liou | H04W 76/19 |
| 2022/0386156 | A1 * | 12/2022 | Park | H04W 24/10 |
| 2024/0223343 | A1 * | 7/2024 | Fakoorian | H04L 5/0055 |

* cited by examiner

*Primary Examiner* — Iqbal Zaidi
(74) *Attorney, Agent, or Firm* — QUALCOMM Incorporated

(57) ABSTRACT

Certain aspects of the present disclosure provide techniques for extended cross link interference measurement and reporting. An example method performed by a first network node may include performing a plurality of measurements on a plurality of resources allocated for uplink transmissions during a period of time, wherein the plurality of resources include resources allocated for at least one of scheduling request transmissions or random access channel transmissions, and transmitting a measurement report based on the plurality of measurements, the measurement report indicating a subset of resources of the plurality of resources with statistical-based cross link interference (CLI) metrics that are less than or equal to a metric threshold.

30 Claims, 11 Drawing Sheets

800

METHOD FOR WIRELESS COMMUNICATION BY A SECOND NETWORK NODE

810

RECEIVING, FROM FIRST NETWORK NODE, A MEASUREMENT REPORT, THE MEASUREMENT REPORT INDICATES, FROM A PLURALITY OF RESOURCES ALLOCATED FOR UPLINK TRANSMISSIONS DURING A PERIOD OF TIME, A SUBSET OF RESOURCES WITH STATISTICAL-BASED CROSS LINK INTERFERENCE (CLI) METRICS THAT ARE LESS THAN OR EQUAL TO A METRIC THRESHOLD, WHEREIN THE PLURALITY OF RESOURCES INCLUDE RESOURCES ALLOCATED FOR AT LEAST ONE OF SCHEDULING REQUEST TRANSMISSIONS OR RANDOM ACCESS CHANNEL TRANSMISSIONS

820

TRANSMITTING SCHEDULING INFORMATION SCHEDULING ONE OR MORE DOWNLINK TRANSMISSIONS FOR THE FIRST NETWORK NODE IN ONE OR MORE RESOURCES OF THE SUBSET OF RESOURCES INDICATED IN THE MEASUREMENT REPORT

830

TRANSMITTING, BASED ON THE SCHEDULING INFORMATION, THE ONE OR MORE DOWNLINK TRANSMISSIONS IN THE ONE OR MORE RESOURCES OF THE SUBSET OF RESOURCES INDICATED IN THE MEASUREMENT REPORT

700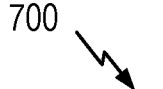

┌─────────────────┐                                          ┌─────────────────┐
│  First Network  │ ⌐704                                 702 ⌐│ Second Network  │
│      Node       │                                          │      Node       │
└─────────────────┘                                          └─────────────────┘

710 ⌐
┌─────────────────────────────┐
│ Perform measurements on a   │
│ plurality of resources      │
│ allocated for UL            │
│ transmissions               │
└─────────────────────────────┘

720 ⌐
Measurement report indicating
subset of resources

730 ⌐
Scheduling information for DL
transmissions in one or more
resources of the subset of resources 740 ⌐
DL transmissions

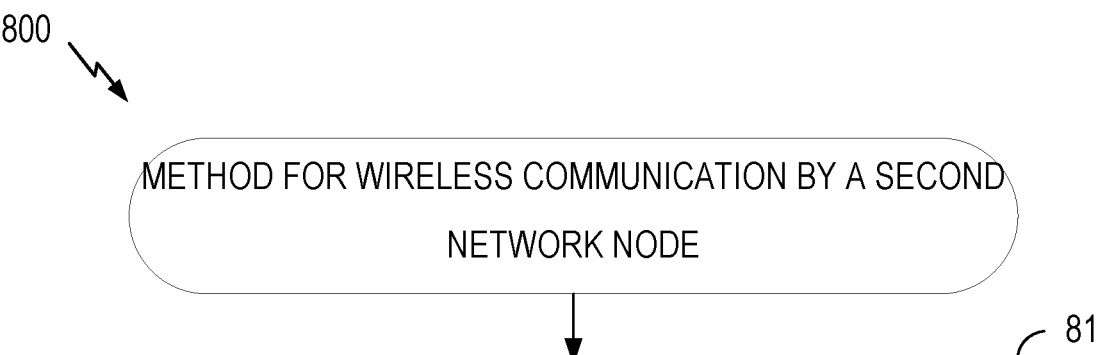

METHOD FOR WIRELESS COMUNICATION BY A SECOND NETWORK NODE

810

RECEIVING, FROM FIRST NETWORK NODE, A MEASUREMENT REPORT, THE MEASUREMENT REPORT INDICATES, FROM A PLURALITY OF RESOURCES ALLOCATED FOR UPLINK TRANSMISSIONS DURING A PERIOD OF TIME, A SUBSET OF RESOURCES WITH STATISTICAL-BASED CROSS LINK INTERFERENCE (CLI) METRICS THAT ARE LESS THAN OR EQUAL TO A METRIC THRESHOLD, WHEREIN THE PLURALITY OF RESOURCES INCLUDE RESOURCES ALLOCATED FOR AT LEAST ONE OF SCHEDULING REQUEST TRANSMISSIONS OR RANDOM ACCESS CHANNEL TRANSMISSIONS

820

TRANSMITTING SCHEDULING INFORMATION SCHEDULING ONE OR MORE DOWNLINK TRANSMISSIONS FOR THE FIRST NETWORK NODE IN ONE OR MORE RESOURCES OF THE SUBSET OF RESOURCES INDICATED IN THE MEASUREMENT REPORT

830

TRANSMITTING, BASED ON THE SCHEDULING INFORMATION, THE ONE OR MORE DOWNLINK TRANSMISSIONS IN THE ONE OR MORE RESOURCES OF THE SUBSET OF RESOURCES INDICATED IN THE MEASUREMENT REPORT

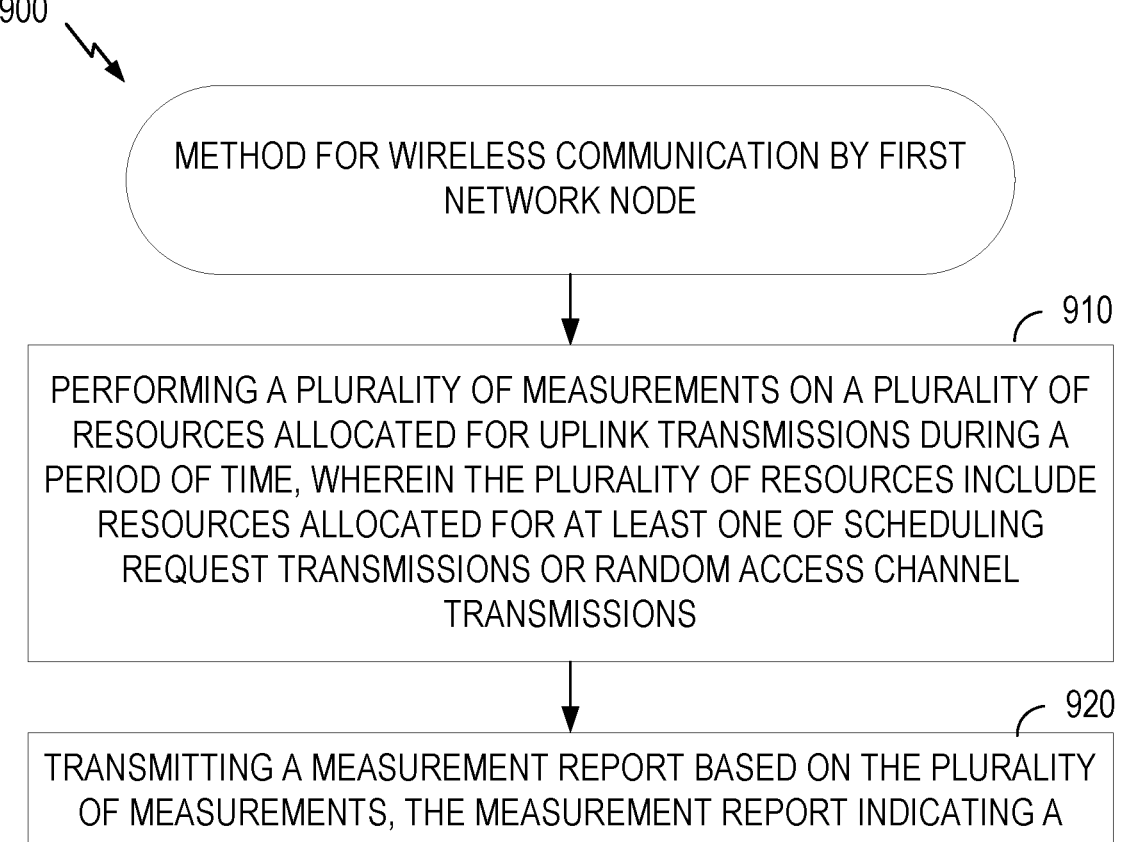

METHOD FOR WIRELESS COMMUNICATION BY FIRST NETWORK NODE

910

PERFORMING A PLURALITY OF MEASUREMENTS ON A PLURALITY OF RESOURCES ALLOCATED FOR UPLINK TRANSMISSIONS DURING A PERIOD OF TIME, WHEREIN THE PLURALITY OF RESOURCES INCLUDE RESOURCES ALLOCATED FOR AT LEAST ONE OF SCHEDULING REQUEST TRANSMISSIONS OR RANDOM ACCESS CHANNEL TRANSMISSIONS

920

TRANSMITTING A MEASUREMENT REPORT BASED ON THE PLURALITY OF MEASUREMENTS, THE MEASUREMENT REPORT INDICATING A SUBSET OF RESOURCES OF THE PLURALITY OF RESOURCES WITH STATISTICAL-BASED CROSS LINK INTERFERENCE (CLI) METRICS THAT ARE LESS THAN OR EQUAL TO A METRIC THRESHOLD

Transceiver

1002

Processing System

1006

1030

1020

Processor(s)

1021

Circuitry for transmitting

1022

Circuitry for receiving

Computer-Readable Medium/Memory

1031

Code for transmitting

1032

Code for receiving

EXTENDED CROSS LINK INTERFERENCE MEASUREMENT AND REPORTING

INTRODUCTION

Aspects of the present disclosure relate to wireless communications, and more particularly, to techniques for extended cross link interference measurement and reporting.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, such challenges may include challenges related to selecting random access channel (RACH) occasions (ROs) for accessing the wireless communication systems. Consequently, there exists a need for further improvements in wireless communications systems to overcome various challenges.

SUMMARY

Certain aspects can be implemented in a method for wireless communication performed by first network node. The method may include performing a plurality of measurements on a plurality of resources allocated for uplink transmissions during a period of time, wherein the plurality of resources include resources allocated for at least one of scheduling request transmissions or random access channel transmissions, and transmitting a measurement report based on the plurality of measurements, the measurement report indicating a subset of resources of the plurality of resources with statistical-based cross link interference (CLI) metrics that are less than or equal to a metric threshold.

Certain aspects can be implemented in a method for wireless communication performed by a second network node. The method may include receiving, from first network node, a measurement report, the measurement report indicates, from a plurality of resources allocated for uplink transmissions during a period of time, a subset of resources with statistical-based cross link interference (CLI) metrics that are less than or equal to a metric threshold, wherein the plurality of resources include resources allocated for at least one of scheduling request transmissions or random access channel transmissions. The method may also include transmitting scheduling information scheduling one or more downlink transmissions for the first network node in one or more resources of the subset of resources indicated in the measurement report. The method may also include transmitting, based on the scheduling information, the one or more downlink transmissions in the one or more resources of the subset of resources indicated in the measurement report.

Other aspects provide apparatuses configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and an apparatus comprising means for performing the aforementioned methods as well as those further described herein.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 7 is an example call flow diagram illustrating example operations for wireless communication between a user equipment and a base station.

FIG. 8 is a flow diagram illustrating example operations for wireless communication by a second network node.

FIG. 9 is a flow diagram illustrating example operations for wireless communication by a first network node.

Figure 1:
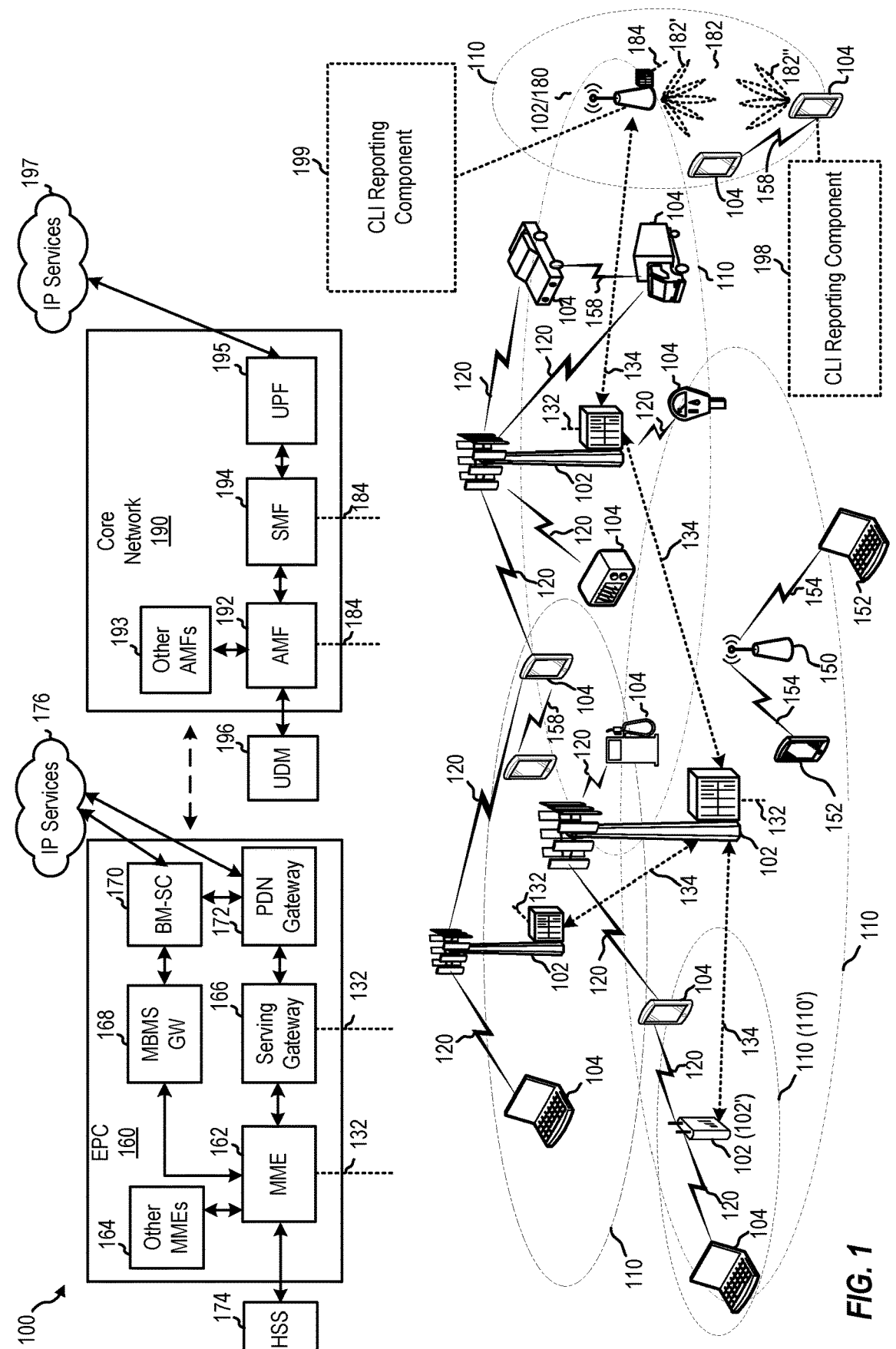
FIG. 1 is a block diagram conceptually illustrating an example wireless communication network.

The following description and the appended figures set forth certain features for purposes of illustration.

DETAILED DESCRIPTION

Aspects of the present disclosure provide apparatuses, methods, processing systems, and computer-readable mediums for extending cross link interference measurement and reporting.

For example, in some cases, when a base station in a wireless network is capable of full-duplex operation, resources within the wireless network may be more efficiently used, for example, by simultaneously transmitting downlink (DL) data to a first user equipment (UE) and receiving uplink (UL) data from a second UE. However, when full-duplex operation is used to communicate with both UEs, this communication may be subject to cross link interference (CLI).

To help reduce CLI, certain periodic UL resources may be good candidates to be used for FD operations. These periodic UL resources may include resources allocated for random access channel (RACH) transmissions and/or resources allocated for scheduling request (SR) transmissions, each of which are regularly scheduled but only occasionally used, resulting in a relatively large subset of these resources without any actual UL transmissions.

As such, it may be beneficial to repurpose these periodic UL resources for DL transmissions. However, DL transmissions within these repurposable UL resources may still occasionally be subject to CLI if an UL transmission is still, in fact, transmitted on these repurposable UL resources. To help avoid these situations, it may be beneficial for a UE that is a candidate to be scheduled for DL transmissions within these repurposable UL resources to measure and report potential CLI on these resources, allowing the BS to more accurately decide whether to schedule DL transmissions for the UE.

A legacy framework may exist for reporting CLI. However, this legacy framework is problematic when performing and reporting CLI measurements for RACH/SR resources. For example, one such problem is due to the fact that CLI measurements performed according to the legacy framework are combined/averaged and filtered using certain filtering coefficients. This presents issues with the RACH/SR resources. For example, because RACH/SR resources are only occasionally used and, thus, strong/significant CLI only occasionally occurs in these resources, this strong CLI may not be properly reflected in the filtered/combined/averaged CLI measurements. One way to help reduce the chances of occasional strong CLI not being properly reflected in the filtered/combined/averaged CLI measurements may be to perform measurements and report individual CLI measurements for individual resources. However, performing CLI measurements and reporting the CLI measurements for each individual resource may unnecessarily consume a significant amount of time and frequency resources in the wireless network. Additionally, such reporting may unnecessarily consume significant power resources at the UE.

Therefore, aspects of the present disclosure provide techniques for extending CLI measurements and reporting to help alleviate/avoid the issues described above with respect to CLI measurements for RACH/SR resources. For example, in some cases, the techniques presented herein may involve performing measurements on resources allocated for UL transmission, such as resources allocated for at least one of scheduling request transmissions or random access channel transmissions, and transmitting a transmitting a measurement report that indicates a subset of resources that have statistical-based CLI metrics that are less than or equal to a metric threshold. In some cases, the measurement report may also include the statistical-based CLI metrics for the reported subset of resources.

These statistical-based CLI metrics may be advantageous over measurements performed according to the legacy framework as combining, averaging, and filtering is not applied, avoiding situations in which information is lost due to the bursty nature of the RACH/SR resources. Additionally, statistical-based CLI metrics may be beneficial over individual resource measurements as the statistical-based CLI metrics avoid having to report each individual measurement, avoiding the consumption of time, frequency, and power resources associated with transmitting all of the individual measurements.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 includes cross link interference (CLI) reporting component 199, which may be configured to perform the operations shown in FIGS. 7 and 8, as well as other operations described herein for extended cross link interference measurement and reporting. Wireless communication network 100 further includes CLI reporting component 198, which may be used configured to perform the operations shown in FIGS. 7 and 9, as well as other operations described herein for extended cross link interference measurement and reporting.

Figure 2:
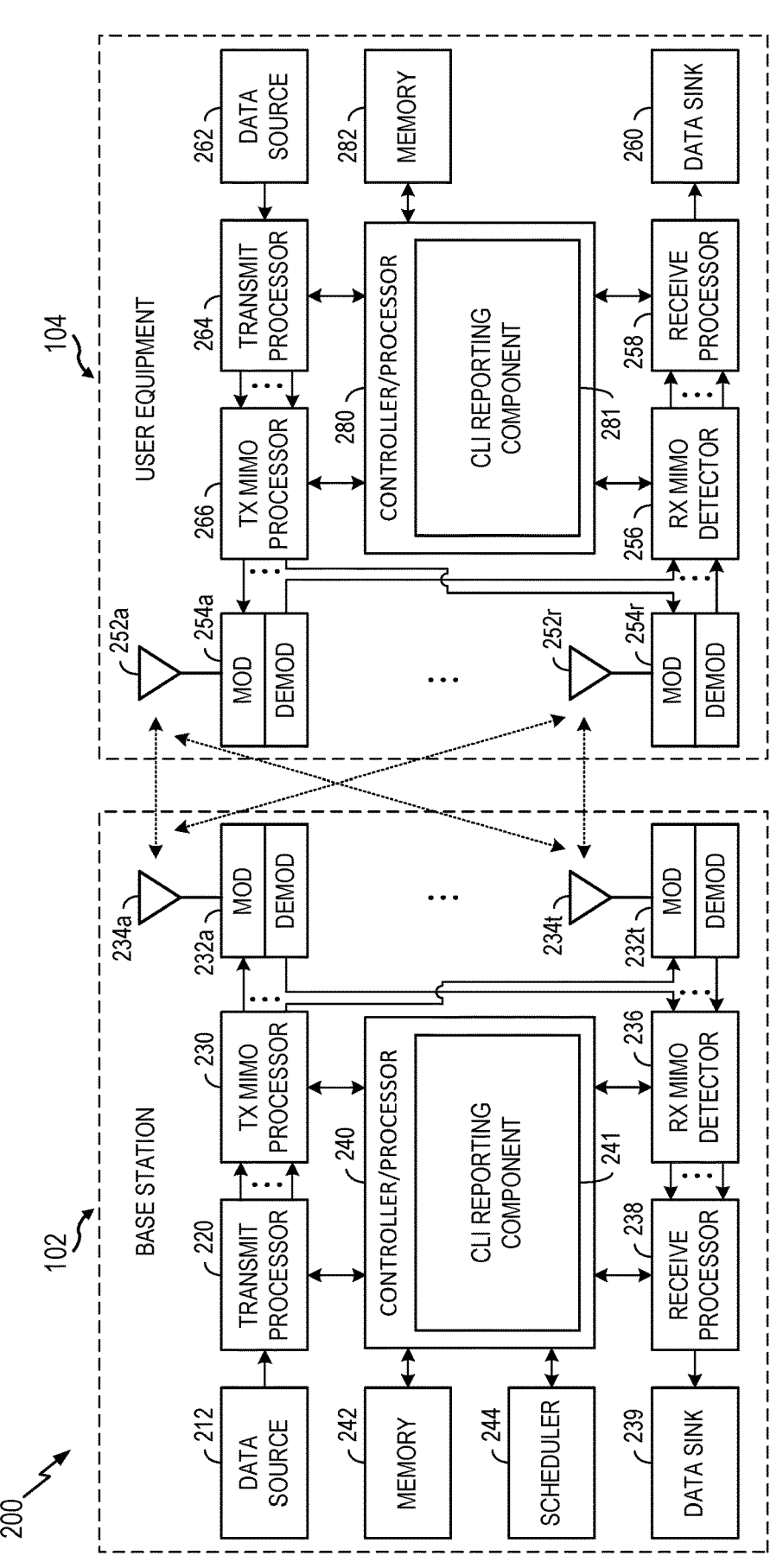
FIG. 2 is a block diagram conceptually illustrating aspects of an example base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes CLI reporting component 241, which may be representative of CLI reporting component 199 of FIG. 1. Notably, while depicted as an aspect of controller/processor 240, CLI reporting component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes CLI reporting component 281, which may be representative of CLI reporting component 198 of FIG. 1. Notably, while depicted as an aspect of controller/processor 280, CLI reporting component 281 may be implemented additionally or alternatively in various other aspects of UE 104 in other implementations.

Figure 3:
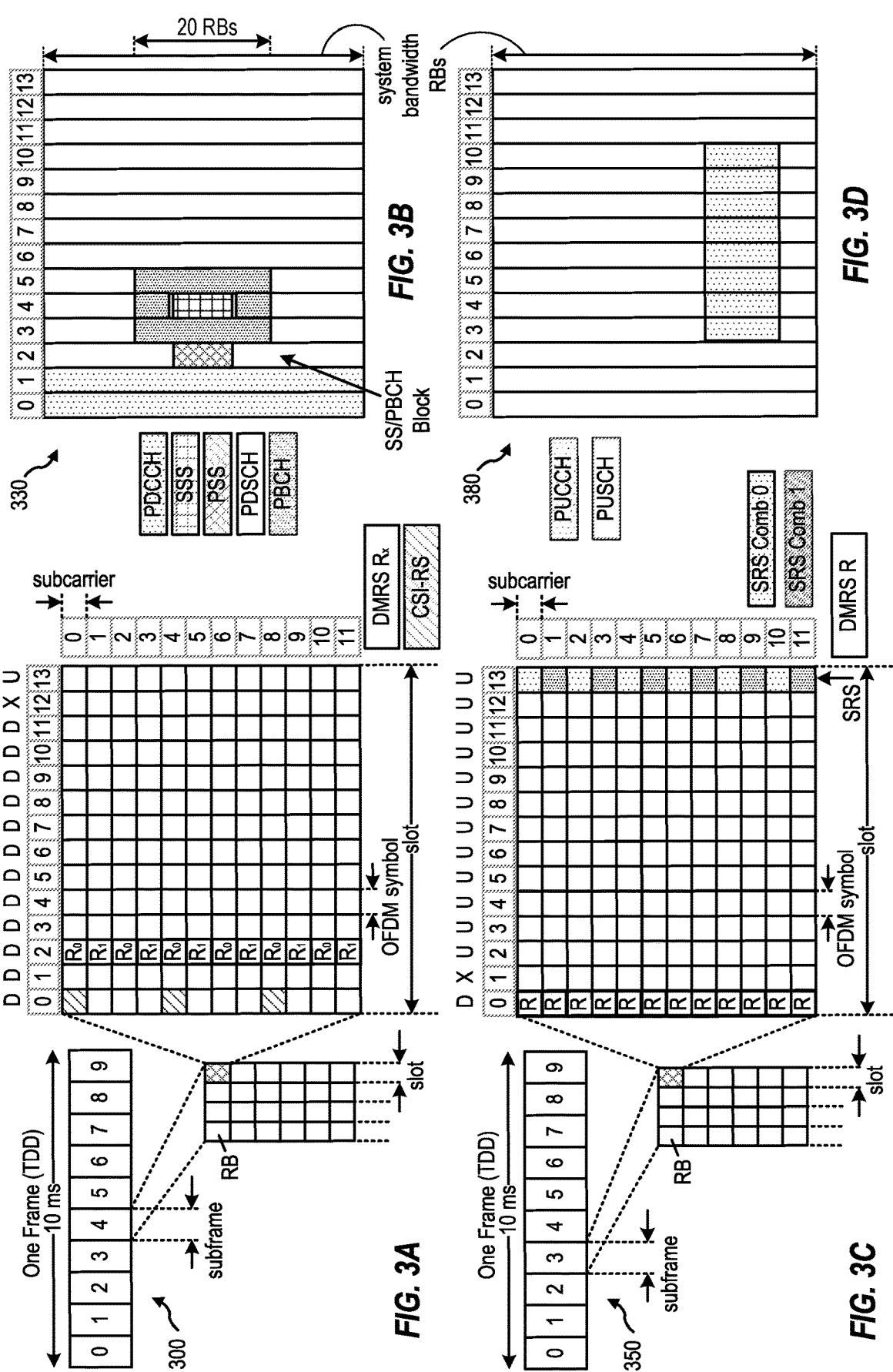
FIGS. 3A-3D depict various example aspects of data structures for a wireless communication network.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHZ, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mm Wave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Introduction to Integrated Access and Backhaul Networks

Figure 4:
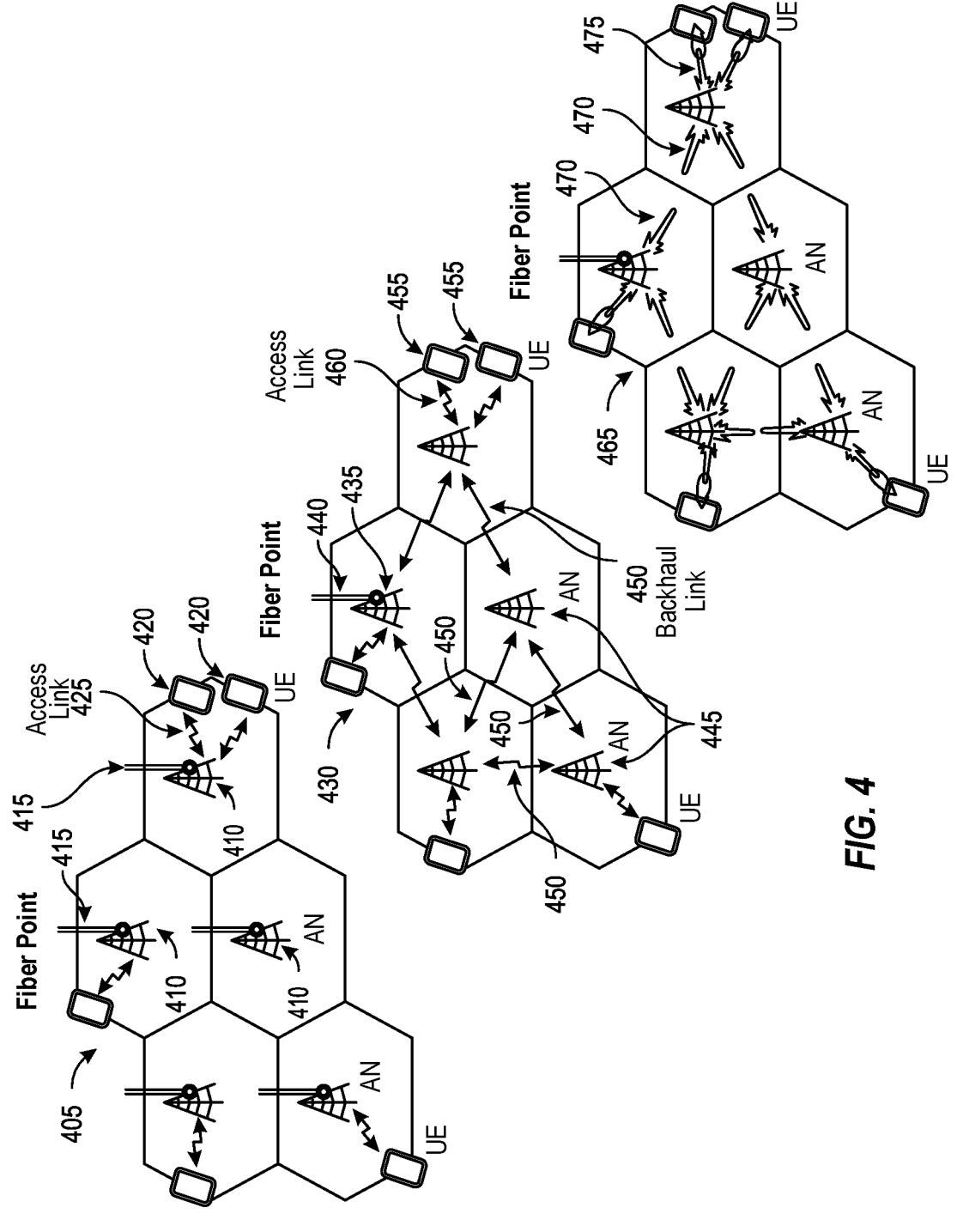
FIG. 4 is a diagram illustrating examples of radio access networks, in accordance with various aspects of the present disclosure.

FIG. 4 is a diagram illustrating examples of radio access networks, in accordance with various aspects of the disclosure.

As shown by reference number 405, a traditional (for example, 3G, 4G, LTE) radio access network may include multiple base stations 410 (for example, access nodes (AN)), where each base station 410 communicates with a core network via a wired backhaul link 415, such as a fiber connection. A base station 410 may communicate with a UE 420 via an access link 425, which may be a wireless link. In some aspects, a base station 410 shown in FIG. 4 may correspond to a base station 102 shown in FIG. 1. Similarly, a UE 420 shown in FIG. 4 may correspond to a UE 104 shown in FIG. 1.

As shown by reference number 430, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 435. The anchor base station may communicates with a core network via a wired backhaul link 440, such as a fiber connection. An anchor base station 435 may also be referred to as an IAB donor. Anchor base stations can be configured to communicate with other types of base stations or other communication devices (e.g. in a radio network or IAB network).

The IAB network may also include one or more non-anchor base stations 445. Non-anchor base stations may be referred to as relay base stations or IAB nodes. The non-anchor base station 445 may communicate directly with or indirectly with (for example, via one or more other non-anchor base stations 445) the anchor base station 435 via one or more backhaul links 450 to form a backhaul path to the core network for carrying backhaul traffic. Backhaul link 450 may be a wireless link. Anchor base station(s) 435 or non-anchor base station(s) 445 may communicate with one or more UEs 455 via access links 460, which may be wireless links for carrying access traffic. In some aspects, an anchor base station 435 or a non-anchor base station 445 shown in FIG. 4 may correspond to a BS 102 shown in FIG. 1. Similarly, a UE 455 shown in FIG. 4 may correspond to a UE 104 shown in FIG. 1.

As shown by reference number 465, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 470 between base stations may use millimeter waves to carry information or may be directed toward a target base station using beamforming, precoding. Similarly, the wireless access links 475 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, and spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with BS 102 for that IAB node, and an MT of an IAB node may perform functions described in connection with UE 104 for that IAB node.

Figure 5:
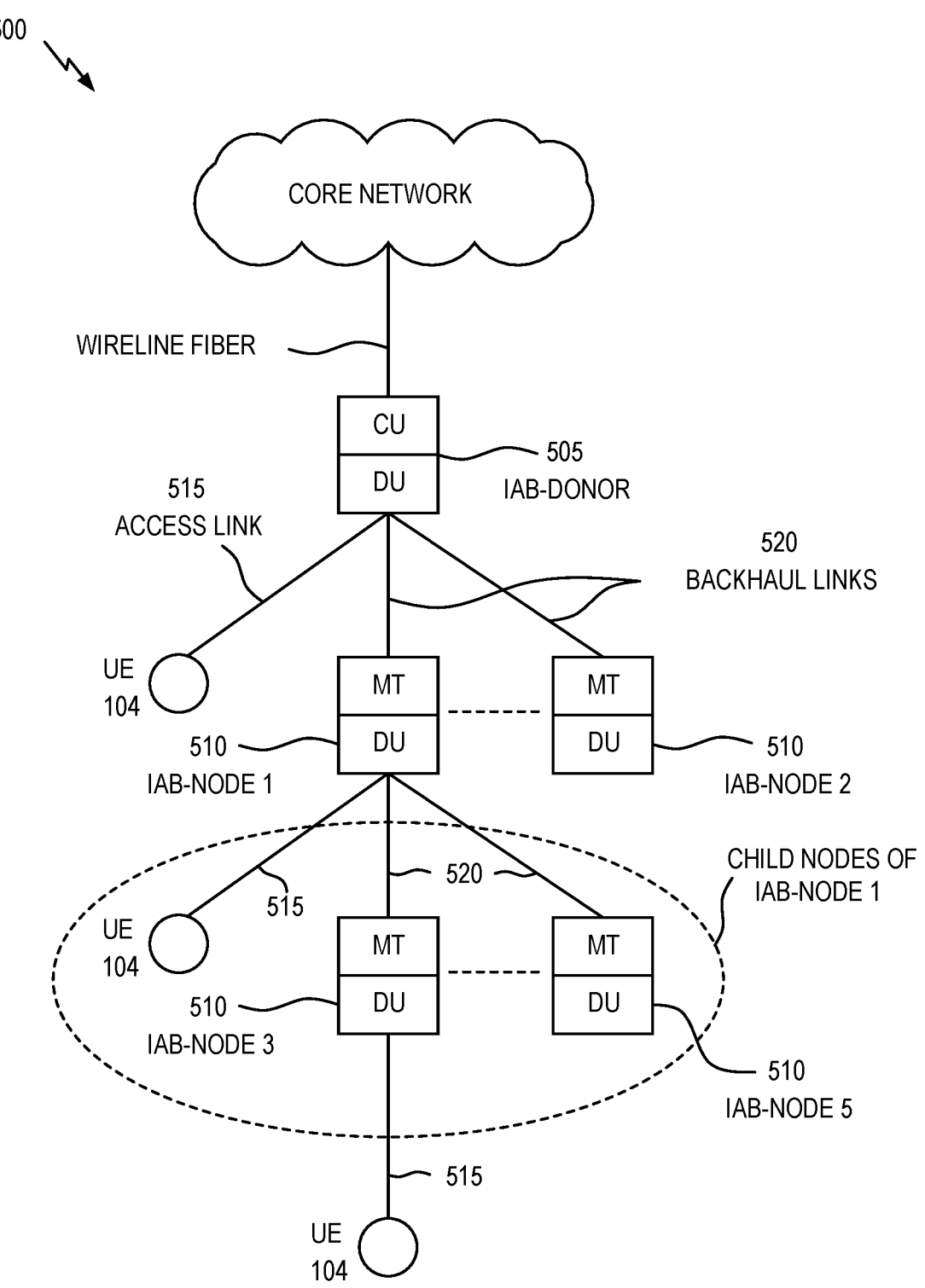
FIG. 5 is a diagram illustrating an example of an integrated access and backhaul (IAB) network architecture in accordance with various aspects of the disclosure.

FIG. 5 is a diagram illustrating an example of an IAB network architecture, in accordance with various aspects of the disclosure. As shown in FIG. 5, an IAB network may include an IAB donor 505 that connects to a core network via a wired connection (for example, as a wireline fiber). For example, an Ng interface of an IAB donor 505 may terminate at a core network. Additionally, or alternatively, an IAB donor 505 may connect to one or more devices of the core network that provide a core access and mobility management function (AMF). In some aspects, an IAB donor 505 may include a BS 102, such as an anchor base station, as described above in connection with FIG. 4. As shown, an IAB donor 505 may include a CU, which may perform ANC functions or AMF functions. The CU may configure a DU of the IAB donor 505 or may configure one or more IAB nodes 510 (for example, an MT or a DU of an IAB node 510) that connect to the core network via the IAB donor 505. Thus, a CU of an IAB donor 505 may control or configure the entire IAB network that connects to the core network via the IAB donor 505, such as by using control messages or configuration messages (for example, a radio resource control (RRC) configuration message, an F1 application protocol (F1AP) message).

As described above, the IAB network may include IAB nodes 510 (shown as IAB nodes 1 through 4) that connect to the core network via the IAB donor 505. As shown, an IAB node 510 may include an MT and may include a DU. The MT of an IAB node 510 (for example, a child node) may be controlled or scheduled by another IAB node 510 (for example, a parent node) or by an IAB donor 505. The DU of an IAB node 510 (for example, a parent node) may control or schedule other IAB nodes 510 (for example, child nodes of the parent node) or UEs 104. Thus, a DU may be referred to as a scheduling node or a scheduling component, and an MT may be referred to as a scheduled node or a scheduled component. In some aspects, an IAB donor 505 may include a DU and not an MT. That is, an IAB donor 505 may configure, control, or schedule communications of IAB nodes 510 or UEs 104. A UE 104 may include only an MT, and not a DU. That is, communications of a UE 104 may be controlled or scheduled by an IAB donor 505 or an IAB node 510 (for example, a parent node of the UE 104).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 505 or an IAB node 510, and a child node may be an IAB node 510 or a UE 104.

Communications of an MT of a child node may be controlled or scheduled by a parent node of the child node.

As further shown in FIG. 5, a link between a UE 104 and an IAB donor 505, or between a UE 104 and an IAB node 510, may be referred to as an access link 515. Each access link 515 may be a wireless access link that provides a UE 104 with radio access to a core network via the IAB donor 505, and potentially via one or more IAB nodes 510.

As further shown in FIG. 5, a link between an IAB donor 505 and an IAB node 510, or between two IAB nodes 510, may be referred to as a backhaul link 520. Each backhaul link 520 may be a wireless backhaul link that provides an IAB node 510 with radio access to a core network via the IAB donor 505, and potentially via one or more other intermediate IAB nodes 510. In some aspects, a backhaul link 520 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 515 and backhaul links 520.

Introduction to Multi-Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 6A:
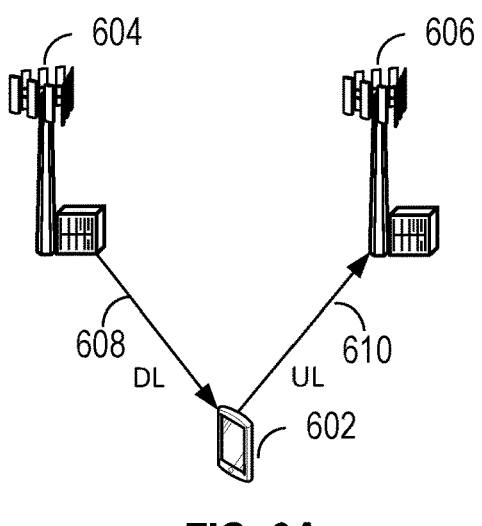
FIGS. 6A, 6B, and 6C illustrates different full-duplex use cases within a wireless communication network.
Figure 6B:
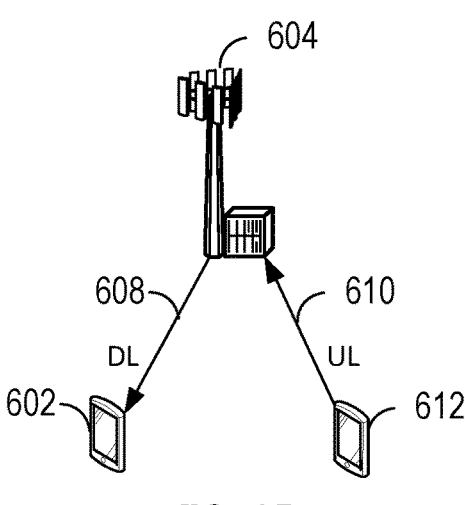
Figure 6C:
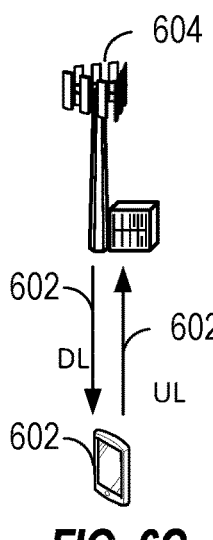

FIGS. 6A-6C illustrates different FD use cases within a wireless communication network, such as the wireless communication network 100. For example, FIG. 6A illustrates a first FD use case involving transmission between one UE 602 and two base stations (or multiple transmission reception points (mTRP)), BS 604 and BS 606. In some cases, UE 602 may be representative of UE 104 of FIG. 1 and BSs 604, 606 may be representative of BS 102 of FIG. 1. As shown, the UE 602 may simultaneously receive DL transmissions 608 from the BS 606 and transmit UL transmissions 610 to the BS 606. In some cases, the DL transmissions 608 and UL transmissions 610 may be performed using different antenna panels to facilitate the simultaneous transmission and reception.

A second FD use case is illustrated in FIG. 6B involving two different UEs and one BS. As illustrated, the UE 602 may receive DL transmissions 608 from the BS 604 while another UE 612 may simultaneously transmit UL transmission 610 to the BS 604. Thus, in this example, BS 604 is conducting simultaneous uplink and downlink communications.

A third FD use case is illustrated in FIG. 6C involving one BS and one UE. As illustrated, the UE 602 may receive DL transmissions 608 from the BS 604 and may simultaneously transmit UL transmissions 610 to the BS 604. As noted above, such simultaneous reception/transmission by the UE 602 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 6A) for mTRP |
| FD enabled | FD disabled | Use case #2 (FIG. 6B) + R-16 IAB |
| FD enabled | FD enabled | Use case #3 (FIG. 6C) |

As shown, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 6A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 6B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 6C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Aspects Related to Extended Cross Link Interference Measurement and Reporting

When a base station (e.g., BS 102) in a wireless network is capable of full-duplex operation, resources within the wireless network may be more efficiently used, for example, by simultaneously transmitting downlink (DL) data to a first user equipment (UE) and receiving uplink (UL) data from a second UE. However, when full-duplex operation is used to communicate with both UEs, this communication may be subject to cross link interference (CLI).

To help reduce CLI, certain periodic UL resources, such as resources allocated for random access channel (RACH) transmissions and/or resources allocated for scheduling request (SR) transmissions, may be good candidates to be used for FD operations. For example, these UL resources are allocated periodically and, as such, they cause large resource overhead. Moreover, there may be cases in which, although these resources are allocated periodically, there are no actual periodic UL communications within these resources. For example, there may be cases in which a UE only occasionally sends a RACH transmission and/or SR transmission on the UL resources, resulting in a relatively large subset of these resources without any actual UL transmissions taking place. As such, it may be beneficial to repurpose at least some of these for FD DL transmissions to one or more UEs.

However, if these resources were to be repurposed for DL transmissions to one or more first UEs and there happens to be UL transmissions by one or more second UEs on these same resources, the UL transmissions may cause significant CLI to reception of the DL transmissions by the one or more first UEs. In such cases, not only would an efficiency of reusing these resources not be increased (e.g., frustrating the original purpose for reusing these resources), the significant CLI may result wasted time and frequency resources in the wireless network and an increase in power consumption at both UE and BS sides due to unnecessary unsuccessful DL communications.

Accordingly, to help avoid situations in which DL and UL transmissions collide in a repurposed UL resource, it may be beneficial for a UE, that is a candidate to be scheduled to receive a DL transmission that overlaps with (cell-specific/periodic) UL resources that are primarily allocated for RACH and/or SR, to measure and report potential CLI on these resources. This measurement report indicating potential CLI may allow the BS to more accurately decide whether to schedule DL transmissions for the UE and, if scheduled, how to choose a DL configuration for the UE (e.g., in terms of a modulation and coding scheme (MCS), a reference signal (RS) configuration, etc.)

In legacy systems, there exists a legacy CLI framework for performing and reporting CLI measurements. However, performing and reporting CLI measurements for RACH/SR resources presents certain issues. For example, in the legacy CLI framework, a UE may perform layer 3 (L3) CLI measurements and L3 reporting. When this L3 CLI report is transmitted by the UE to a BS, the L3 CLI report is received by a distributed unit (DU) of the BS in a transparent container and is forwarded to a centralized unit (CU) of the BS. In other words, the DU of the BS is unable to see/understand the contents of L3 CLI report. This can be problematic because it is the DU of the BS that performs the scheduling of the UE and, if the DU does not have information regarding the potential CLI within the repurposable UL resources (e.g., the UL RACH/SR resources that are capable of being repurposed for DL transmissions) from the L3 CLI report, the DU may not be able to efficiently schedule the UE to receive DL transmissions within these UL transmissions, leading, in some cases, to collisions between UL and DL transmissions and wasted time, frequency, and power resources, as described above. Additionally, even if the CU were to forward the CLI report to the scheduler in the DU, this may lead to increased latency when trying to schedule a UE in the repurposable UL resources and missed scheduling opportunities.

Moreover, when performing L3 measurements, such as L3 CLI measurements, these measurements are combined/averaged and filtered using L3 filtering coefficients. This combining/filtering may be problematic when CLI measurements are performed on UL RACH/SR resources. For example, because RACH/SR resource use is occasional/bursty (e.g., not periodic), long-term L3 measurement/filtering may lead to loss of useful information. That is, if there is only occasionally strong/significant CLI in these RACH/SR resources, this strong CLI may not be properly reflected in the filtered/combined/averaged L3 CLI measurements, resulting in an inaccurate CLI measurement report. This inaccurate CLI measurement report may, in turn, lead to a UE being scheduled to receive downlink transmissions in repurposed UL resources that collide with UL transmissions in the same UL resources, resulting in wasted time, frequency, and power resources, as described above.

In some cases, one way to help reduce the chances of lost information associated with an L3 CLI measurement report may be to perform layer one (L1) measurements and report individual CLI measurements for each individual resource. However, performing CLI measurements and reporting the CLI measurements for each individual resource may unnecessarily consume a significant amount of time and frequency resources in the wireless network. Additionally, such reporting may unnecessarily consume significant power resources at the UE.

Therefore, aspects of the present disclosure provide techniques for extending CLI measurements and reporting to help alleviate/avoid the issues described above with respect to CLI measurements for RACH/SR resources. For example, in some cases, the techniques presented herein may involve performing measurements on resources allocated for UL transmission, such as resources allocated for at least one of scheduling request transmissions or random access channel transmissions, and transmitting a transmitting a measurement report that indicates a subset of resources that have statistical-based CLI metrics that are less than or equal to a metric threshold. In some cases, the measurement report may also include the statistical-based CLI metrics for the reported subset of resources.

The statistical-based CLI metrics may include at least one of a probability that the measurements for the particular resource is above measurement threshold during the period of time or a value where a probability that the measurements for the particular resource are less than this value is equal to a particular percentile threshold. These statistical-based CLI metrics may be advantageous over L3-based CLI metrics as L3 combining, averaging, and filtering is not applied to these measurements, avoiding situations in which information is lost due to the bursty nature of the RACH/SR resources. Additionally, statistical-based CLI metrics may be beneficial over typical L1 measurements as the statistical-based CLI metrics avoid having to report each individual L1 measurement, avoiding the consumption of time, frequency, and power resources associated with transmitting all of the individual L1 measurements.

Example Call Flow Illustrating Operations for Extended Cross Link Interference Measurement and Reporting FIG. 7 is a call flow diagram illustrating example operations 700 between a first network node 704 and a second network node 702 for extended cross link interference measurements and reporting. In some cases, first network node 704 may be an example of the UE 104 illustrated in FIGS. 1 and 2 and the second network node 702 may be an example of the BS 102 illustrated in FIGS. 1 and 2. In some cases, the first network node 704 may be an example of an IAB node, such as IAB node 510 illustrated in FIG. 5, and the second network node 702 may be an example of another IAB node, such as IAB donor 505.

As shown, operations 700 begin at 710 with the first network node 704 performing a plurality of measurements on a plurality of resources allocated for uplink transmissions during a period of time, wherein the plurality of resources include resources allocated for at least one of scheduling request transmissions or random access channel transmissions. In some cases, the plurality of measurements may include L1-type measurements.

Thereafter, at 720, the first network node 704 transmits a measurement report based on the plurality of measurements to the second network node 702. In some cases, the measurement report indicates a subset of resources of the plurality of resources with statistical-based cross link interference (CLI) metrics that are less than or equal to a metric threshold.

Thereafter, at 730, the first network node 704 may optionally receive scheduling information scheduling one or more downlink transmissions for the first network node 704 in one or more resources of the subset of resources indicated in the measurement report.

Additionally, as shown at 740, the first network node 704 may optionally receive, based on the scheduling information, the one or more downlink transmissions in the one or more resources of the subset of resources indicated in the measurement report As noted above, the measurement report indicates a subset of resources of the plurality of resources. This subset of resources may be a subset of "good" of resources with "sufficiently low" CLI. In some cases, the measurement report further includes the statistical-based CLI metrics for at least the subset of resources indicated in the measurement report.

This indication may be used when determining whether to schedule the first network node 704 with one or more downlink transmissions in the one or more resources of the subset of resources indicated in the measurement report. For example, because the statistical-based CLI metric associated with the subset of resources indicated in the measurement report is less than or equal to a metric threshold, it may be assumed that downlink transmissions within the one or more resources of the subset of resources will not experience a significant amount of CLI and, as such, the first network node 704 may be scheduled with the one or more downlink transmissions on these resources.

In some cases, the statistical-based CLI metric may not be the typical L1 or L3 measurements, but rather a metric that indicates other temporal statistics of L1 measurements. For example, in some cases, for a particular resource of the plurality of resources, the statistical-based CLI metrics may comprise a probability (e.g., a fraction of time) that the measurements (e.g., L1 measurements) for the particular resource is above measurement threshold during the period of time. As noted above, the measurement report may indicate a subset of resources with a "sufficiently low" CLI. When a probability metric is used, "sufficiently low" may be defined in terms of a constraint on that probability metric, such as the measurement threshold. In such cases, the subset of resources indicated within the measurement report may be those resources from the plurality of resources for which the probability of (L1 measurements for the resources>measurement threshold)<metric threshold. Stated otherwise, the subset of resources indicated within the measurement report may include those resources for which the probability that those resources will be greater than the measurement threshold during the period of time is then than the metric threshold (e.g., is less than a probability threshold). For example, assume that the metric threshold is 10% and that the measurement threshold is X. A particular resource from the plurality of resources may be included within the subset provided that the probability that this particular resource has a measurement greater than X during the period of time is less than 10%. In other words, the particular resource may be included within the subset of resources provided that the measurements of this particular resource during the period of time are not greater than X more than 10% of the time.

In some cases, for a particular resource of the plurality of resources, the statistical-based CLI metrics may comprise a value (e.g., a percentile) where a probability that the measurements for the particular resource are less than this value is equal to a particular percentile threshold. For example, this value may indicate that this particular resource is within the Xth percentile (e.g., X=10, 50, 90) or the L1 measurements. When this percentile value/metric is used, "sufficiently low" may be defined in terms of a constraint on that percentile value/metric, such as the percentile threshold. In such cases, the subset of resources indicated within the measurement report may be those resources from the plurality of resources for which X % (L1 measurements) <percentile threshold).

In some cases, to derive the statistical-based CLI metrics a length of the period of time in which to perform the one or more measurements or the number of measurements to perform in the period of time may be configured. For example, in some cases, the length of the period of time or the number of measurements to perform in the period of time may be preconfigured in memory of the first network node 704 (e.g., by a manufacturer, network operator, retailer, etc. of the first network node 704). In other cases, the first network node 704 may receive an indication from the second network node 702 indicating or updating the length of the period of time or the number of measurements to perform in the period of time.

As noted above, the measurement report indicates a subset of resources of the plurality of resources with statistical-based CLI metrics that are less than or equal to a metric threshold. The manner in which resources in the subset of resources are indicated in the measurement report may vary.

For example, in some cases, when the plurality of resources measured by the first network node 704 comprise resources allocated for random access channel transmissions, the measurement report may further include an indication of one or more random access channel occasions associated with the subset of resources during the period of time over which the plurality of measurements are performed. In other words, the subset of resources with statistical-based CLI metrics that are less than or equal to a metric threshold may be indicated using one or more random access channel occasions corresponding to the resources included in the subset. In other cases, the measurement report may further include an indication of one or more synchronization signal block (SSB) indices associated with the subset of resources during the period of time. In other words, the subset of resources with statistical-based CLI metrics that are less than or equal to a metric threshold may be indicated using one or more SSB indices corresponding to the resources included in the subset.

In some cases, when the plurality of resources measured by the first network node 704 comprise resources allocated for scheduling request transmissions, the measurement report may further include an indication of one or more scheduling request identifiers associated with the subset of resources during the period of time. In other words, the subset of resources with statistical-based CLI metrics that are less than or equal to a metric threshold may be indicated using one or more scheduling request identifiers corresponding to the resources included in the subset.

Aspects Related to UE-to-BS Reporting

As noted above, in some cases, the first network node 704 comprises a UE (e.g., UE 104) and the second network node

702 comprises a BS (e.g., BS 102). In such cases, the measurements performed by the first network node 704 (e.g., UE 104) at 710 may include L1 received signal strength indicator (RSSI) measurements. Additionally, when the first network node 704 comprises a UE and the second network node comprises a BS, the plurality of resources allocated for the uplink transmissions comprise resources allocated for at least one of scheduling request transmissions to a base station associated with a group of UEs including the UE or random access channel transmissions to a base station associated with a group of UEs including the UE.

In some cases, configuration of the measurements at the first network node 704 may be simplified. For example, in some cases, RACH and/or SR resources may be known at the first network node 704 based on system information (e.g., system information block one (SIB1)) or other dedicated radio resource control (RRC) signaling received from the BS.

In such cases, because the RACH and/or SR resources may be known at the first network node 704, the second network node 702 may transmit configuration information to the first network node 704 for performing the plurality of measurements on the plurality of resources allocated for the uplink transmissions. The first network node 704 may then perform the plurality of measurements based on the configuration information.

In some cases, the configuration information indicates the resources on which to perform the plurality of measurements at 710 in FIG. 7. For example, in some cases, the configuration information includes at least one of a set of random access channel occasion (RO) indices associated with the plurality of resources (e.g., resources allocated for RACH transmissions) to perform the plurality of measurements on or a set of SR identifiers associated with the plurality of resources (e.g., resources allocated for SR transmissions) to perform the plurality of measurements on.

In some cases, the first network node 704 may be configured to perform the plurality of measurements on all resources in the plurality of resources allocated for uplink transmissions. In such cases, the configuration information may simply indicate or trigger the first network node 704 to perform the measurements. In such cases, the configuration information may include, for example, system information, such as SIB1 from the second network node 702.

In other cases, the first network node 704 may perform the plurality of measurements autonomously without receiving configuration information from the second network node 702. For example, in this case, the first network node 704 may autonomously choose the resources of the plurality of resources to perform the measurements on.

Aspects Related to IAB Node Reporting

In some cases, an IAB node, such as the IAB node 510 (e.g., IAB-node 1) illustrated in FIG. 5, may be able to support simultaneous MT reception and DU reception. More specifically, the IAB node may support simultaneous UL reception from a child IAB node/UE (e.g., IAB-node 3/UE 104 in FIG. 5) on UL resources allocated for RACH and/or SR RX associated with the DU of the IAB node as well as reception via the collocated MT component of the IAB node from a parent IAB node (e.g., IAB donor 505 in FIG. 5). In such cases, the MT of the IAB node may be subject to large CLI from some of the child IAB nodes/UEs sending RACH or SR to the collocated DU of the IAB node. As such, the IAB node may perform CLI measurements (e.g., at 710 in FIG. 7) on these RACH/SR resources associated with the DU of the IAB node and may report to this parent IAB node.

In comparison to the UE-to-BS case described above, when the first network node 704 comprises an IAB node, the plurality of resources allocated for the uplink transmissions comprise resources allocated for at least one of SR transmissions or RACH transmissions to DU of the IAB node. When the first network node 704 comprises a UE, the plurality of resources allocated for the uplink transmissions comprise resources allocated for at least one of SR transmissions or RACH transmissions to a base station associated with a group of UEs including the UE.

As noted above, in some cases, the first network node 704 comprises an IAB node (e.g., a child IAB node, such as IAB node 510/IAB node 1 in FIG. 5) and the second network node 702 comprises another IAB node, such as a parent IAB node and/or CU (e.g., from the CU of IAB donor 505 in FIG. 5). In some cases, when the first network node 704 comprises an IAB node, the first network node 704 may be an example of the IAB node 1 (e.g., IAB node 510) in FIG. 5 and the second network node 702 may be an example of the IAB donor 505 in FIG. 5. In other cases, the first network node 704 may be an example of IAB node 3 (e.g., IAB node 510) in FIG. 5 and the second network node 702 may be an example of the IAB donor 505 or the IAB node 1 (e.g., IAB node 510) in FIG. 5).

Additionally, as noted above, the first network node 704 may perform the plurality of measurements at 710 in FIG. 7 based on configuration information. In some cases, the first network node 704 may receive the configuration information at an MT component of the first network node 704 from a CU component associated with the first network node 704. In some cases, the CU component associated with the first network node 704 may include, for example, the CU of the IAB donor 505 (e.g., second network node 702). In some cases, the first network node 704 may receive the configuration information at an MT component of the first network node 704 from a parent IAB node associated with the first network node 704. For example, in some cases, when the first network node 704 comprises the IAB node 3 in FIG. 5, the parent IAB node from which the configuration information is received may include the IAB node 1 in FIG. 5.

In such cases, when the first network node 704 comprises an IAB node, the configuration information may include information for configuring the plurality of measurements at the MT of the first network node 704 on UL resources (e.g., for RACH/SR) of the collocated DU of the first network node 704. For example, in some cases, the second network node 702 (e.g., a parent IAB node and/or CU component) may transmit the configuration information to an MT component of the first network node 704, including an indication of at least one of a set of RO indices associated with the plurality of resources of the DU to perform the plurality of measurements on and/or a set of SR identifiers associated with the plurality of resources of the DU to perform the plurality of measurements on.

In some cases, as noted above, the first network node 704 (e.g., IAB node) may be configured to perform the plurality of measurements on all resources in the plurality of resources associated with the DU of the first network node 704. In such cases, the configuration information from the second network node 702 (e.g., parent IAB node and/or CU) may simply indicate or trigger the MT of the first network node 704 to perform the plurality of measurements on all resources in the plurality of resources (e.g., ROs and/or SRs) associated with the DU of the first network node 704.

In other cases, the first network node 704 (e.g., IAB node) may perform the plurality of measurements autonomously without receiving configuration information from the second network node 702 (e.g., IAB parent node). For example, in this case, the MT of the first network node 704 may autonomously choose the resources of the plurality of resources (e.g., ROs and/or SRs) of the DU of the first network node 704 to perform the measurements on.

In some cases, when the first network node 704 comprises an IAB node, the first network node 704 may be aware of the reference signals and channels to be sent on the plurality of resources. As such, since the first network node 704 is aware of the reference signals and channels to be sent on the plurality of resources (e.g., the reference signals and channels to be received/processed by the DU of the first network node 704), the plurality of measurements performed by the MT of the first network node 704 may comprise CLI-based RSSI measurements or CLI-based RSRP measurements (e.g., RACH RSRP, SR RSPR, demodulation reference signal (DMRS) RSRP, and the like).

In some cases, when the first network node 704 comprises an IAB node, the MT component of the first network node 704 may transmit the measurement report to the second network node 702 (e.g., a parent IAB node and/or CU) at 720 in FIG. 7 including the statistical-based CLI metrics for the plurality of resources measured associated with the collocated DU of the first network node 704. In some cases, the first network node 704 may provide a measurement report to the second network node 702 for each receive beam of the MT component of the first network entity. In other words, transmitting the measurement report at 720 in FIG. 7 may include transmitting a plurality of measurement reports and transmitting the plurality of measurement reports comprises transmitting one measurement report of the plurality of measurements reports per receive beam associated with the MT component of the first network node 704 (e.g., IAB node)

In some cases, the first network node 704 (e.g., MT component) may indicate preferred and/or not-preferred beams for transmissions between the MT component and the second network node 702 per (DU) resource (e.g., RO and/or SR resources) indicated in the subset of resources in the measurement report. For example, in some cases, the first network node may indicate in the measurement report at least one of one or more preferred beams associated with one or more resources of the subset of resources (e.g., of the DU component of the first network node) or one or more non-preferred beams associated with one or more resources of the subset of resources. The one or more preferred/non-preferred beams may be for transmissions between the first network node 704 (e.g., an MT component) and the second network node 702 (e.g., parent IAB node and/or CU). Additionally, the first network node 704 may indicate a statistical-based CLI metric to the preferred/non-preferred beams and/or resources (e.g., RO/SR resources associated with a DU component of the first network node 704) to indicate how often interference may be below or above a threshold. In other words, the measurement report transmitted at 720 in FIG. 7 by the first network node 704 may indicate the statistical-based CLI metrics for the one or more preferred beams or one or more non-preferred beams.

Example Method for Extended Cross Link
Interference Measurement and Reporting

FIG. 8 is a flow diagram illustrating example operations 800 for wireless communication. The operations 800 may be performed, for example, by a second network entity (e.g., such as the BS 102 in the wireless communication network 100 of FIG. 1 or one of the IAB nodes illustrated in FIG. 5, such as the IAB donor 505 or the IAB node 510) for extended cross link interference measurement and reporting. The operations 800 may be implemented as software components that are executed and run on one or more processors (e.g., controller/processor 240 of FIG. 2). Further, the transmission and reception of signals by the second network node in operations 800 may be enabled, for example, by one or more antennas (e.g., antennas 234 of FIG. 2). In certain aspects, the transmission and/or reception of signals by the second network node may be implemented via a bus interface of one or more processors (e.g., controller/processor 240) obtaining and/or outputting signals.

The operations 800 begin, at 810, with receiving, from a first network node, a measurement report, the measurement report indicates, from a plurality of resources allocated for uplink transmissions during a period of time, a subset of resources with statistical-based cross link interference (CLI) metrics that are less than or equal to a metric threshold, wherein the plurality of resources include resources allocated for at least one of scheduling request transmissions or random access channel transmissions.

In block 820, the second network node transmits scheduling information scheduling one or more downlink transmissions for the first network node in one or more resources of the subset of resources indicated in the measurement report.

In block 830, the second network node transmits, based on the scheduling information, the one or more downlink transmissions in the one or more resources of the subset of resources indicated in the measurement report.

In some cases, the measurement report further includes the statistical-based CLI metrics for at least the subset of resources indicated in the measurement report.

In some cases, for a particular resource of the plurality of resources, the statistical-based CLI metrics comprise at least one of: a probability that measurements for the particular resource is above measurement threshold during the period of time, or a value where a probability that measurements for the particular resource are less than this value is equal to a particular percentile threshold.

In some cases, the first network node comprises a user equipment (UE) and the measurements comprise received signal strength indicator (RSSI) measurements.

In some cases, the first network node comprises an integrated access and backhaul (IAB) node and the measurements comprise at least one of: received signal strength indicator (RSSI) measurements or reference signal received power (RSRP) measurements.

In some cases, the measurement report further includes at least one of: an indication of one or more random access channel occasions associated with the subset of resources during the period of time, one or more synchronization signal block (SSB) indices associated with the subset of resources during the period of time, or one or more scheduling request identifiers associated with the subset of resources during the period of time.

In some cases, operations 800 may further include transmitting configuration information for performing a plurality of measurements on the plurality of resources allocated for the uplink transmissions.

In some cases, the first network node comprises a user equipment (UE) the second network node comprises a base station (BS).

In some cases, the first network node comprises an integrated access and backhaul (IAB) node. Additionally, in some cases, the second network node comprises a centralized unit and transmitting the configuration information comprises transmitting the configuration information to a mobile termination (MT) component of the IAB node. In some cases, the second network node comprises a parent node and transmitting the configuration information comprises transmitting the configuration information to a mobile termination (MT) component of the IAB node.

In some cases, operations 800 may further include transmitting an indication of the plurality of resources in a system information block (SIB). In some cases, the configuration information comprises an indication to perform the measurements.

In some cases, the configuration information includes at least one of a set of random access channel occasions associated with the plurality of resources to perform a plurality of measurements on or a set of scheduling request identifiers associated with the plurality of resources to perform a plurality of measurements on.

In some cases, the first network node comprises a user equipment (UE) and the second network node comprises a base station (BS). Additionally, in some cases, the plurality of resources allocated for the uplink transmissions comprise resources allocated for at least one of: scheduling request transmissions to the base station associated with a group of UEs including the UE, or random access channel transmissions to the base station associated with a group of UEs including the UE.

In some cases, the first network node comprises an integrated access and backhaul (IAB) node. Additionally, in some cases, the plurality of resources allocated for the uplink transmissions comprise resources allocated for at least one of: scheduling request transmissions to a distributed unit (DU) of the IAB node, or random access channel transmissions to a distributed unit (DU) of the IAB node.

In some cases, receiving the measurement report in block 810 comprises receiving a plurality of measurement reports and receiving the plurality of measurement reports comprises receiving one measurement report of the plurality of measurements reports per receive beam associated with a mobile terminating (MT) component of the IAB node.

In some cases, the measurement report indicates at least one of: one or more preferred beams associated with one or more resources of the subset of resources, or one or more non-preferred beams associated with one or more resources of the subset of resources.

In some cases, the measurement report indicates the statistical-based CLI metrics for the one or more preferred beams or one or more non-preferred beams.

FIG. 9 is a flow diagram illustrating example operations 900 for wireless communication, in accordance with certain aspects of the present disclosure. The operations 900 may be performed, for example, by a first network node (e.g., such as the UE 104 in the wireless communication network 100 of FIG. 1 or one of the IAB nodes illustrated in FIG. 5, such as the IAB node 1, IAB node 3, etc.) for extended cross link interference measurement and reporting. The operations 900 may be complementary to the operations 800 performed by the second network node. The operations 900 may be implemented as software components that are executed and run on one or more processors (e.g., controller/processor 280 of FIG. 2). Further, the transmission and reception of signals by the first network node in operations 900 may be enabled, for example, by one or more antennas (e.g., antennas 252 of FIG. 2). In certain aspects, the transmission and/or reception of signals by the first network may be implemented via a bus interface of one or more processors (e.g., controller/processor 280) obtaining and/or outputting signals.

The operations 900 begin, in block 910, with performing a plurality of measurements on a plurality of resources allocated for uplink transmissions during a period of time, wherein the plurality of resources include resources allocated for at least one of scheduling request transmissions or random access channel transmissions.

In block 920, the first network node transmitting a measurement report based on the plurality of measurements, the measurement report indicating a subset of resources of the plurality of resources with statistical-based cross link interference (CLI) metrics that are less than or equal to a metric threshold.

In some cases, operations 900 may further include receiving scheduling information scheduling one or more downlink transmissions for the first network node in one or more resources of the subset of resources indicated in the measurement report. Additionally, operations 900 may further include receiving, based on the scheduling information, the one or more downlink transmissions in the one or more resources of the subset of resources indicated in the measurement report.

In some cases, the measurement report further includes the statistical-based CLI metrics for at least the subset of resources indicated in the measurement report.

In some cases, for a particular resource of the plurality of resources, the statistical-based CLI metrics comprise at least one of: a probability that the measurements for the particular resource is above measurement threshold during the period of time, or a value where a probability that the measurements for the particular resource are less than this value is equal to a particular percentile threshold.

In some cases, the first network node comprises a user equipment (UE) and the measurements comprise received signal strength indicator (RSSI) measurements.

In some cases, the first network node comprises an integrated access and backhaul (IAB) node and the measurements comprise at least one of: received signal strength indicator (RSSI) measurements or reference signal received power (RSRP) measurements.

In some cases, the measurement report further includes at least one of: an indication of one or more random access channel occasions associated with the subset of resources during the period of time, one or more synchronization signal block (SSB) indices associated with the subset of resources during the period of time, or one or more scheduling request identifiers associated with the subset of resources during the period of time.

In some cases, operations 900 further include receiving configuration information for performing the plurality of measurements on the plurality of resources allocated for the uplink transmissions, wherein performing the plurality of measurements is based on the configuration information.

In some cases, the first network node comprises a user equipment (UE) and the configuration information is received from a base station (BS).

In some cases, the first network node comprises an integrated access and backhaul (IAB) node. In some cases, receiving the configuration information comprises receiving the configuration information at a mobile termination (MT) component of the IAB node from a centralized unit (CU) component associated with the IAB node. In some cases, receiving the configuration information comprises receiving the configuration information from a parent node associated with the IAB node.

In some cases, operations 900 may further include receiving an indication of the plurality of resources in a system information block (SIB). In some cases, the configuration information comprises an indication to perform the measurements.

In some cases, configuration information includes at least one of a set of random access channel occasions associated with the plurality of resources to perform the plurality of measurements or a set of scheduling request identifiers associated with the plurality of resources to perform the plurality of measurements.

In some cases, the first network node comprises a user equipment (UE). Additionally, in some cases, the plurality of resources allocated for the uplink transmissions comprise resources allocated for at least one of: scheduling request transmissions to a base station associated with a group of UEs including the UE, or random access channel transmissions to a base station associated with a group of UEs including the UE.

In some cases, the first network node comprises an integrated access and backhaul (IAB) node. In some cases, the plurality of resources allocated for the uplink transmissions comprise resources allocated for at least one of: scheduling request transmissions to a distributed unit (DU) of the IAB node, or random access channel transmissions to a distributed unit (DU) of the IAB node.

In some cases, transmitting the measurement report in block 920 comprises transmitting a plurality of measurement reports and transmitting the plurality of measurement reports comprises transmitting one measurement report of the plurality of measurements reports per receive beam associated with a mobile terminating (MT) component of the IAB node.

In some cases, the measurement report indicates at least one of: one or more preferred beams associated with one or more resources of the subset of resources, or one or more non-preferred beams associated with one or more resources of the subset of resources.

In some cases, the measurement report indicates the statistical-based CLI metrics for the one or more preferred beams or one or more non-preferred beams.

Example Wireless Communication Devices

Figure 10:
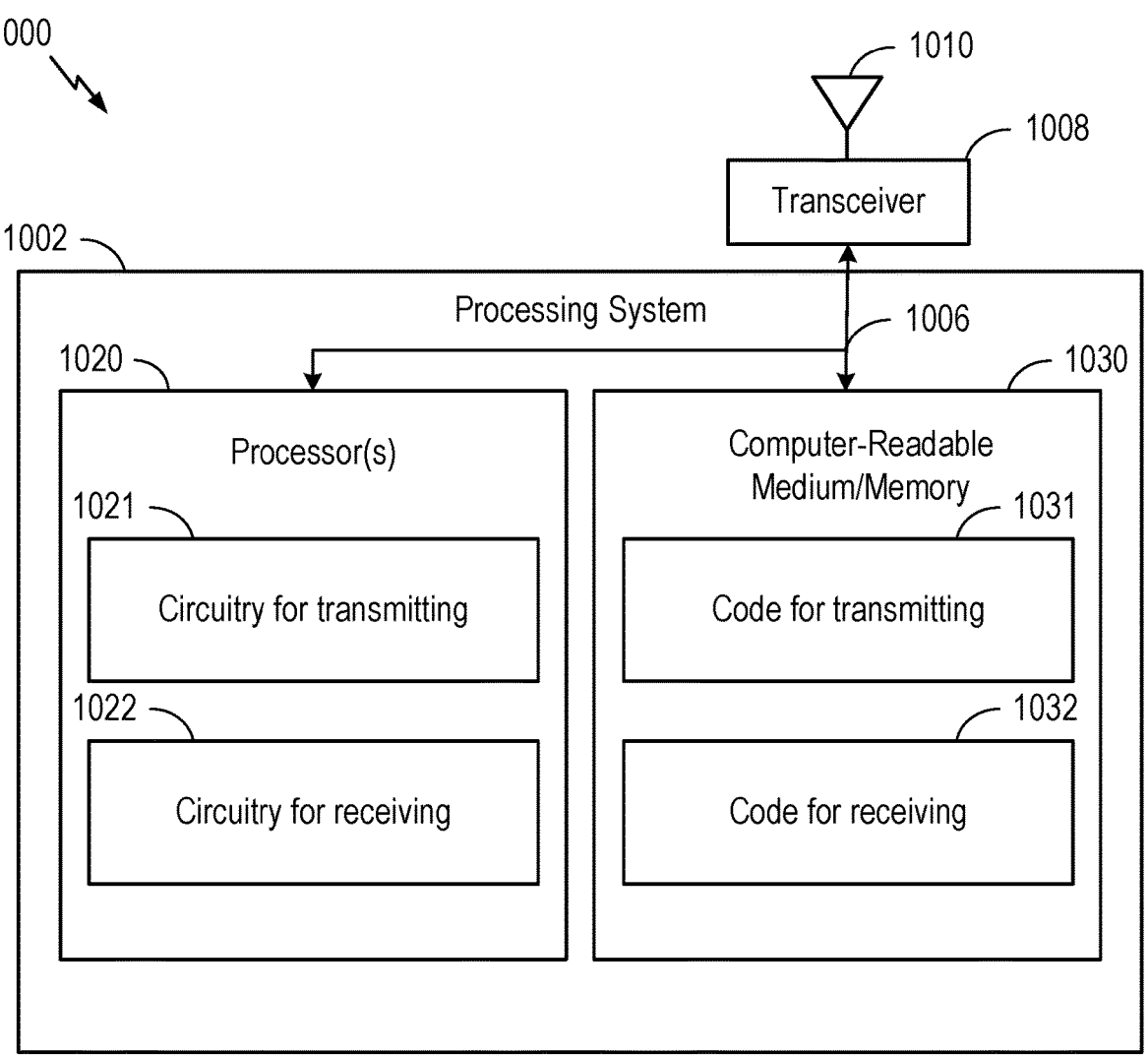
FIG. 10 illustrates an example wireless communications device configured to perform operations for the methods disclosed herein.

FIG. 10 depicts an example communications device 1000 that includes various components operable, configured, or adapted to perform operations for the techniques disclosed herein, such as the operations depicted and described with respect to FIGS. 7-8. In some examples, communication device 1000 may be a BS 102 as described, for example with respect to FIGS. 1 and 2, or one of the IAB nodes illustrated in FIG. 5, such as the IAB donor 505 or the IAB node 510.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 7-8, or other operations for performing the various techniques discussed herein for extended cross link interference measurement and reporting.

In the depicted example, computer-readable medium/memory 1030 stores code 1031 for transmitting and code 1032 for receiving.

In the depicted example, the one or more processors 1020 include circuitry configured to implement the code stored in the computer-readable medium/memory 1030, including circuitry 1021 for transmitting and circuitry 1022 for receiving.

Various components of communications device 1000 may provide means for performing the methods described herein, including with respect to FIGS. 7-8.

In some examples, means for transmitting or sending (or means for outputting for transmission) may include the transceivers 232 and/or antenna(s) 234 of the BS 102 illustrated in FIG. 2 and/or transceiver 1008 and antenna 1010 of the communication device 1000 in FIG. 10.

In some examples, means for receiving (or means for obtaining) may include the transceivers 232 and/or antenna(s) 234 of the base station illustrated in FIG. 2 and/or transceiver 1008 and antenna 1010 of the communication device 1000 in FIG. 10.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

Notably, FIG. 10 is an example, and many other examples and configurations of communication device 1000 are possible.

Figure 11:
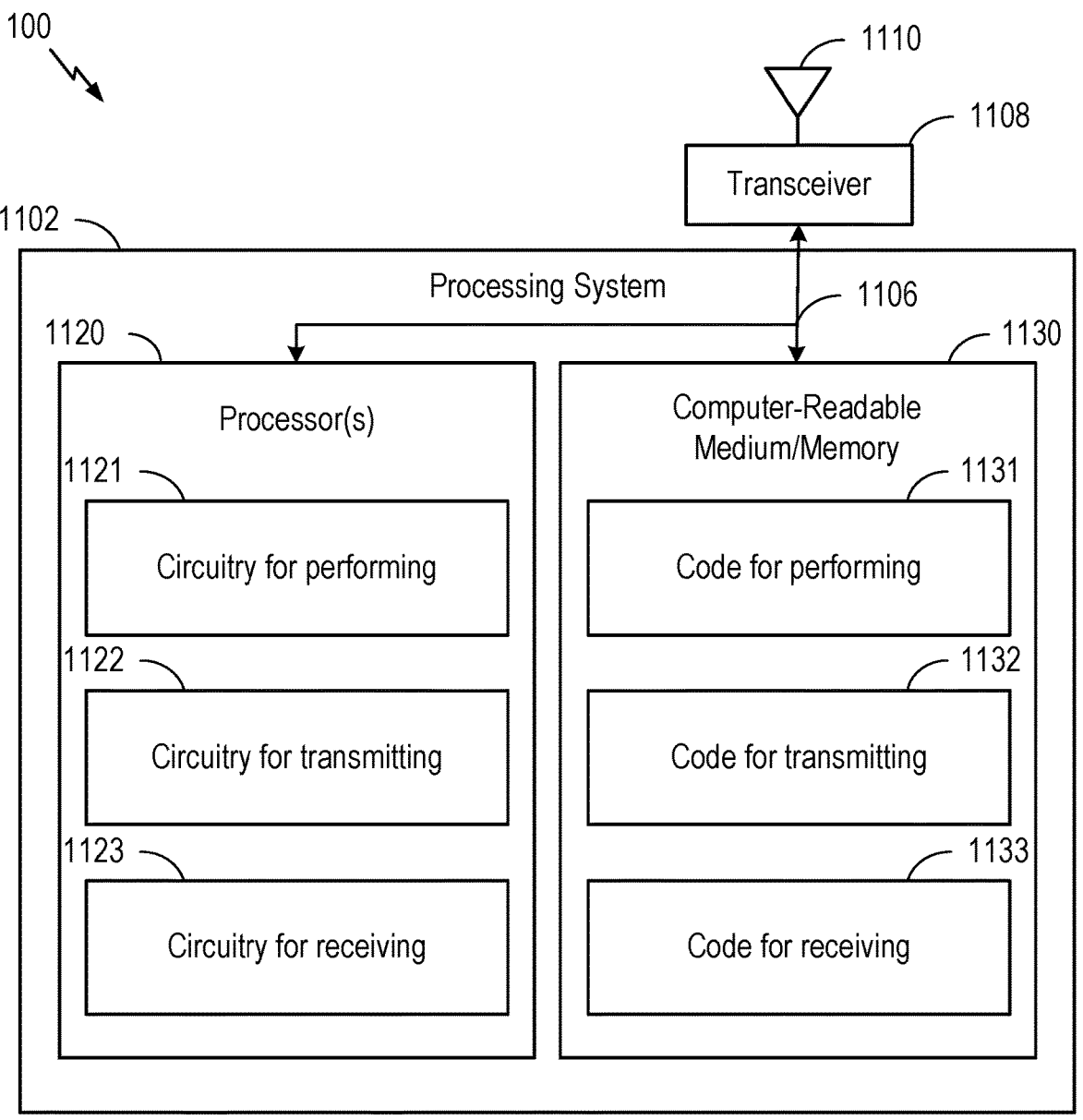
FIG. 11 illustrates an example wireless communications device configured to perform operations for the methods disclosed herein.

FIG. 11 depicts an example communications device 1100 that includes various components operable, configured, or adapted to perform operations for the techniques disclosed herein, such as the operations depicted and described with respect to FIGS. 7 and 9. In some examples, communication device 1100 may be a UE 104 as described, for example with respect to FIGS. 1 and 2, or one of the IAB nodes illustrated in FIG. 5, such as the IAB node 1, IAB node 3, etc.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7 and 9, or other operations for performing the various techniques discussed herein for extended cross link interference measurement and reporting.

In the depicted example, computer-readable medium/memory 1130 stores code 1131 for performing, code 1132 for transmitting, and code 1133 for receiving.

In the depicted example, the one or more processors 1120 include circuitry configured to implement the code stored in the computer-readable medium/memory 1130, including circuitry 1121 for performing, circuitry 1122 for transmitting, and circuitry 1123 for receiving.

Various components of communications device 1100 may provide means for performing the methods described herein, including with respect to FIGS. 7 and 9.

In some examples, means for transmitting or sending (or means for outputting for transmission) may include the transceivers 254 and/or antenna(s) 252 of the UE 104 illustrated in FIG. 2 and/or transceiver 1108 and antenna 1110 of the communication device 1100 in FIG. 11.

In some examples, means for receiving (or means for obtaining) may include the transceivers 254 and/or antenna(s) 252 of the UE 104 illustrated in FIG. 2 and/or transceiver 1108 and antenna 1110 of the communication device 1100 in FIG. 11.

In some examples, means for performing may include various processing system components, such as: the one or more processors 1120 in FIG. 11, or aspects of the UE 104 depicted in FIG. 2, including receive processor 258, transmit processor 264, TX MIMO processor 266, and/or controller/processor 280 (including CLI report component 281).

Notably, FIG. 11 is an example, and many other examples and configurations of communication device 1100 are possible.

EXAMPLE CLAUSES

Implementation examples are described in the following numbered clauses:

Clause 1: A method for wireless communication by a first network node, comprising: performing a plurality of measurements on a plurality of resources allocated for uplink transmissions during a period of time, wherein the plurality of resources include resources allocated for at least one of scheduling request transmissions or random access channel transmissions; transmitting a measurement report based on the plurality of measurements, the measurement report indicating a subset of resources of the plurality of resources with statistical-based cross link interference (CLI) metrics that are less than or equal to a metric threshold.

Clause 2: The method of Clause 1, further comprising: receiving scheduling information scheduling one or more downlink transmissions for the first network node in one or more resources of the subset of resources indicated in the measurement report; and receiving, based on the scheduling information, the one or more downlink transmissions in the one or more resources of the subset of resources indicated in the measurement report.

Clause 3: The method of any one of Clauses 1-2, wherein the measurement report further includes the statistical-based CLI metrics for at least the subset of resources indicated in the measurement report.

Clause 4: The method of any one of Clauses 1-3, wherein, for a particular resource of the plurality of resources, the statistical-based CLI metrics comprise at least one of: a probability that the measurements for the particular resource is above measurement threshold during the period of time, or a value where a probability that the measurements for the particular resource are less than this value is equal to a particular percentile threshold.

Clause 5: The method of Clause 4, wherein: the first network node comprises a user equipment (UE) and the measurements comprise received signal strength indicator (RSSI) measurements, or the first network node comprises an integrated access and backhaul (IAB) node and the measurements comprise at least one of: received signal strength indicator (RSSI) measurements or reference signal received power (RSRP) measurements.

Clause 6: The method of any one of Clauses 1-5, wherein the measurement report further includes at least one of: an indication of one or more random access channel occasions associated with the subset of resources during the period of time, one or more synchronization signal block (SSB) indices associated with the subset of resources during the period of time, or one or more scheduling request identifiers associated with the subset of resources during the period of time.

Clause 7: The method of any one of Clauses 1-6, further comprising receiving configuration information for performing the plurality of measurements on the plurality of resources allocated for the uplink transmissions, wherein performing the plurality of measurements is based on the configuration information.

Clause 8: The method of Clause 7, wherein: the first network node comprises a user equipment (UE), and the configuration information is received from a base station (BS).

Clause 9: The method of Clause 7, wherein: the first network node comprises an integrated access and backhaul (IAB) node, and at least one of: receiving the configuration information comprises receiving the configuration information at a mobile termination (MT) component of the IAB node from a centralized unit (CU) component associated with the IAB node, or receiving the configuration information comprises receiving the configuration information from a parent node associated with the IAB node.

Clause 10: The method of Clause 7, further comprising receiving an indication of the plurality of resources in a system information block (SIB), wherein the configuration information comprises an indication to perform the measurements.

Clause 11: The method of Clause 7, wherein the configuration information includes at least one of a set of random access channel occasions associated with the plurality of resources to perform the plurality of measurements or a set of scheduling request identifiers associated with the plurality of resources to perform the plurality of measurements.

Clause 12: The method of any one of Clauses 1-8 or 10-11, wherein: the first network node comprises a user equipment (UE), and the plurality of resources allocated for the uplink transmissions comprise resources allocated for at least one of: scheduling request transmissions to a base station associated with a group of UEs including the UE, or random access channel transmissions to a base station associated with a group of UEs including the UE.

Clause 13: The method of any one of Clauses 1-7 or 9-11, wherein the first network node comprises an integrated access and backhaul (IAB) node.

Clause 14: The method of Clause 13, wherein the plurality of resources allocated for the uplink transmissions comprise resources allocated for at least one of: scheduling request transmissions to a distributed unit (DU) of the IAB node, or random access channel transmissions to a distributed unit (DU) of the IAB node.

Clause 15: The method of any one of Clauses 13-14, wherein transmitting the measurement report comprises transmitting a plurality of measurement reports and transmitting the plurality of measurement reports comprises transmitting one measurement report of the plurality of measurements reports per receive beam associated with a mobile terminating (MT) component of the IAB node.

Clause 16: The method of any one of Clauses 13-15, wherein the measurement report indicates at least one of: one or more preferred beams associated with one or more resources of the subset of resources, or one or more non-preferred beams associated with one or more resources of the subset of resources.

Clause 17: The method of Clause 16, wherein the measurement report indicates the statistical-based CLI metrics for the one or more preferred beams or one or more non-preferred beams.

Clause 18: A method for wireless communication by a second network node, comprising: receiving, from first network node, a measurement report, the measurement report indicates, from a plurality of resources allocated for uplink transmissions during a period of time, a subset of resources with statistical-based cross link interference (CLI) metrics that are less than or equal to a metric threshold, wherein the plurality of resources include resources allocated for at least one of scheduling request transmissions or random access channel transmissions; transmitting scheduling information scheduling one or more downlink transmissions for the first network node in one or more resources of the subset of resources indicated in the measurement report; and transmitting, based on the scheduling information, the one or more downlink transmissions in the one or more resources of the subset of resources indicated in the measurement report.

Clause 19: The method of Clause 18, wherein the measurement report further includes the statistical-based CLI metrics for at least the subset of resources indicated in the measurement report.

Clause 20: The method of any one of Clauses 18-19, wherein, for a particular resource of the plurality of resources, the statistical-based CLI metrics comprise at least one of: a probability that the measurements for the particular resource is above measurement threshold during the period of time, or a value where a probability that the measurements for the particular resource are less than this value is equal to a particular percentile threshold.

Clause 21: The method of Clause 20, wherein: the first network node comprises a user equipment (UE) and the measurements comprise received signal strength indicator (RSSI) measurements, or the first network node comprises an integrated access and backhaul (IAB) node and the measurements comprise at least one of: received signal strength indicator (RSSI) measurements or reference signal received power (RSRP) measurements.

Clause 22: The method of any one of Clauses 18-21, wherein the measurement report further includes at least one of: an indication of one or more random access channel occasions associated with the subset of resources during the period of time, one or more synchronization signal block (SSB) indices associated with the subset of resources during the period of time, or one or more scheduling request identifiers associated with the subset of resources during the period of time.

Clause 23: The method of any one of Clauses 18-22, further comprising transmitting configuration information for performing the plurality of measurements on the plurality of resources allocated for the uplink transmissions.

Clause 24: The method of Clause 23, wherein: the first network node comprises a user equipment (UE), and the second network node comprises a base station (BS).

Clause 25: The method of Clause 23, wherein: the first network node comprises an integrated access and backhaul (IAB) node, and one of: the second network node comprises a centralized unit and transmitting the configuration information comprises transmitting the configuration information to a mobile termination (MT) component of the IAB node, or the second network node comprises a parent node and transmitting the configuration information comprises transmitting the configuration information to a mobile termination (MT) component of the IAB node.

Clause 26: The method of Clause 23, further comprising transmitting an indication of the plurality of resources in a system information block (SIB), wherein the configuration information comprises an indication to perform the measurements.

Clause 27: The method of Clause 23, wherein the configuration information includes at least one of a set of random access channel occasions associated with the plurality of resources to perform a plurality of measurements on or a set of scheduling request identifiers associated with the plurality of resources to perform a plurality of measurements on.

Clause 28: The method of any one of Clauses 18-24 or 26-27, wherein: the first network node comprises a user equipment (UE), the second network node comprises a base station, and the plurality of resources allocated for the uplink transmissions comprise resources allocated for at least one of: scheduling request transmissions to the base station associated with a group of UEs including the UE, or random access channel transmissions to the base station associated with a group of UEs including the UE.

Clause 29: The method of any one of Clauses 18-23 or 25-27, wherein the first network node comprises an integrated access and backhaul (IAB) node.

Clause 30: The method of Clause 29, wherein the plurality of resources allocated for the uplink transmissions comprise resources allocated for at least one of: scheduling request transmissions to a distributed unit (DU) of the IAB node, or random access channel transmissions to a distributed unit (DU) of the IAB node.

Clause 31: The method of any one of Clauses 29-30, wherein receiving the measurement report comprises receiving a plurality of measurement reports and receiving the plurality of measurement reports comprises receiving one measurement report of the plurality of measurements reports per receive beam associated with a mobile terminating (MT) component of the IAB node.

Clause 32: The method of any one of Clauses 29-31, wherein the measurement report indicates at least one of: one or more preferred beams associated with one or more resources of the subset of resources, or one or more non-preferred beams associated with one or more resources of the subset of resources.

Clause 33: The method of Clause 32, wherein the measurement report indicates the statistical-based CLI metrics for the one or more preferred beams or one or more non-preferred beams.

Clause 34: An apparatus, comprising: a memory comprising executable instructions; and one or more processors configured to execute the executable instructions and cause the apparatus to perform a method in accordance with any one of Clauses 1-33.

Clause 35: An apparatus, comprising means for performing a method in accordance with any one of Clauses 1-33.

Clause 36: A non-transitory computer-readable medium comprising executable instructions that, when executed by one or more processors of an apparatus, cause the apparatus to perform a method in accordance with any one of Clauses 1-33.

Clause 37: A computer program product embodied on a computer-readable storage medium comprising code for performing a method in accordance with any one of Clauses 1-33.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $24 \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of extended cross link interference measurement and reporting in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first network node, comprising:

performing a plurality of measurements on a plurality of resources allocated for uplink transmissions during a period of time, wherein the plurality of resources include resources allocated for at least one of scheduling request transmissions or random access channel transmissions;

transmitting a measurement report based on the plurality of measurements, the measurement report indicating a subset of resources of the plurality of resources with statistical-based cross link interference (CLI) metrics that are less than or equal to a metric threshold;

receiving scheduling information scheduling one or more downlink transmissions for the first network node in one or more resources of the subset of resources indicated in the measurement report; and receiving, based on the scheduling information, the one or more downlink transmissions in the one or more resources of the subset of resources indicated in the measurement report.

2. The method of claim 1, wherein the measurement report further includes the statistical-based CLI metrics for at least the subset of resources indicated in the measurement report.

3. The method of claim 1, wherein, for a particular resource of the plurality of resources, the statistical-based CLI metrics comprise at least one of:

a probability that the measurements for the particular resource is above measurement threshold during the period of time, or a value where a probability that the measurements for the particular resource are less than this value is equal to a particular percentile threshold.

4. The method of claim 3, wherein:

the first network node comprises a user equipment (UE) and the measurements comprise received signal strength indicator (RSSI) measurements, or the first network node comprises an integrated access and backhaul (IAB) node and the measurements comprise at least one of:

received signal strength indicator (RSSI) measurements or reference signal received power (RSRP) measurements.

5. The method of claim 1, wherein the measurement report further includes at least one of:

an indication of one or more random access channel occasions associated with the subset of resources during the period of time, one or more synchronization signal block (SSB) indices associated with the subset of resources during the period of time, or one or more scheduling request identifiers associated with the subset of resources during the period of time.

6. The method of claim 1, further comprising receiving configuration information for performing the plurality of measurements on the plurality of resources allocated for the uplink transmissions, wherein performing the plurality of measurements is based on the configuration information.

7. The method of claim 6, wherein:

the first network node comprises a user equipment (UE), and the configuration information is received from a base station (BS).

8. The method of claim 6, wherein:

the first network node comprises an integrated access and backhaul (IAB) node, and at least one of:

receiving the configuration information comprises receiving the configuration information at a mobile termination (MT) component of the IAB node from a centralized unit (CU) component associated with the IAB node, or receiving the configuration information comprises receiving the configuration information from a parent node associated with the IAB node.

9. The method of claim 6, further comprising receiving an indication of the plurality of resources in a system information block (SIB), wherein the configuration information comprises an indication to perform the measurements.

10. The method of claim 6, wherein the configuration information includes at least one of a set of random access channel occasions associated with the plurality of resources to perform the plurality of measurements or a set of scheduling request identifiers associated with the plurality of resources to perform the plurality of measurements.

11. The method of claim 1, wherein:

the first network node comprises a user equipment (UE), and the plurality of resources allocated for the uplink transmissions comprise resources allocated for at least one of:

scheduling request transmissions to a base station associated with a group of UEs including the UE, or random access channel transmissions to a base station associated with a group of UEs including the UE.

12. The method of claim 1, wherein:

the first network node comprises an integrated access and backhaul (IAB) node, and the plurality of resources allocated for the uplink transmissions comprise resources allocated for at least one of:

scheduling request transmissions to a distributed unit (DU) of the IAB node, or random access channel transmissions to a distributed unit (DU) of the IAB node.

13. The method of claim 12, wherein transmitting the measurement report comprises transmitting a plurality of measurement reports and transmitting the plurality of measurement reports comprises transmitting one measurement report of the plurality of measurements reports per receive beam associated with a mobile terminating (MT) component of the IAB node.

14. The method of claim 12, wherein:

the measurement report indicates at least one of:

one or more preferred beams associated with one or more resources of the subset of resources, or one or more non-preferred beams associated with one or more resources of the subset of resources, and the measurement report indicates the statistical-based CLI metrics for the one or more preferred beams or one or more non-preferred beams.

15. A first network node, comprising:

one or more processors configured to execute instructions stored on one or more memories to cause the first network node to:

perform a plurality of measurements on a plurality of resources allocated for uplink transmissions during a period of time, wherein the plurality of resources include resources allocated for at least one of scheduling request transmissions or random access channel transmissions;

transmit a measurement report based on the plurality of measurements, the measurement report indicating a subset of resources of the plurality of resources with statistical-based cross link interference (CLI) metrics that are less than or equal to a metric threshold;

receive scheduling information scheduling one or more downlink transmissions for the first network node in one or more resources of the subset of resources indicated in the measurement report; and receive, based on the scheduling information, the one or more downlink transmissions in the one or more resources of the subset of resources indicated in the measurement report.

16. The first network node of claim 15, wherein the measurement report further includes the statistical-based CLI metrics for at least the subset of resources indicated in the measurement report.

17. The first network node of claim 15, wherein, for a particular resource of the plurality of resources, the statistical-based CLI metrics comprise at least one of:

a probability that the measurements for the particular resource is above measurement threshold during the period of time, or a value where a probability that the measurements for the particular resource are less than this value is equal to a particular percentile threshold.

18. The first network node of claim 17, wherein:

the first network node comprises a user equipment (UE) and the measurements comprise received signal strength indicator (RSSI) measurements, or the first network node comprises an integrated access and backhaul (IAB) node and the measurements comprise at least one of:

received signal strength indicator (RSSI) measurements or reference signal received power (RSRP) measurements.

19. The first network node of claim 15, wherein the measurement report further includes at least one of:

an indication of one or more random access channel occasions associated with the subset of resources during the period of time, one or more synchronization signal block (SSB) indices associated with the subset of resources during the period of time, or one or more scheduling request identifiers associated with the subset of resources during the period of time.

20. The first network node of claim 15, wherein the one or more processors are further configured to cause the first network node to receive configuration information for performing the plurality of measurements on the plurality of resources allocated for the uplink transmissions, wherein performing the plurality of measurements is based on the configuration information.

21. The first network node of claim 20, wherein:

the first network node comprises a user equipment (UE), and the configuration information is received from a base station (BS).

22. The first network node of claim 20, wherein:

the first network node comprises an integrated access and backhaul (IAB) node, and at least one of:

the one or more processors are configured to cause the first network node to receive the configuration information at a mobile termination (MT) component of the IAB node from a centralized unit (CU) component associated with the IAB node, or the one or more processors are configured to cause the first network node to receive the configuration information from a parent node associated with the IAB node.

23. The first network node of claim 20, wherein the one or more processors are further configured to cause the first network node to receive an indication of the plurality of resources in a system information block (SIB), wherein the configuration information comprises an indication to perform the measurements.

24. The first network node of claim 20, wherein the configuration information includes at least one of a set of random access channel occasions associated with the plurality of resources to perform the plurality of measurements or a set of scheduling request identifiers associated with the plurality of resources to perform the plurality of measurements.

25. The first network node of claim 15, wherein:

the first network node comprises a user equipment (UE), and the plurality of resources allocated for the uplink transmissions comprise resources allocated for at least one of:

scheduling request transmissions to a base station associated with a group of UEs including the UE, or random access channel transmissions to a base station associated with a group of UEs including the UE.

26. The first network node of claim 15, wherein:

the first network node comprises an integrated access and backhaul (IAB) node, and the plurality of resources allocated for the uplink transmissions comprise resources allocated for at least one of:

scheduling request transmissions to a distributed unit (DU) of the IAB node, or random access channel transmissions to a distributed unit (DU) of the IAB node.

27. The first network node of claim 26, wherein:

in order to transmit, the one or more processors are configured to cause the first network node to transmit a plurality of measurement reports; and in order to transmit the plurality of measurement reports, the one or more processors are configured to cause the first network node to transmit one measurement report of the plurality of measurements reports per receive beam associated with a mobile terminating (MT) component of the IAB node.

28. The first network node of claim 26, wherein:

the measurement report indicates at least one of:

one or more preferred beams associated with one or more resources of the subset of resources, or one or more non-preferred beams associated with one or more resources of the subset of resources, and the measurement report indicates the statistical-based CLI metrics for the one or more preferred beams or one or more non-preferred beams.

29. A first network node, comprising:

means for performing a plurality of measurements on a plurality of resources allocated for uplink transmissions during a period of time, wherein the plurality of resources include resources allocated for at least of scheduling request transmissions or random access channel transmissions;

means for transmitting a measurement report based on the plurality of measurements, the measurement report indicating a subset of resources of the plurality of resources with statistical-based cross link interference (CLI) metrics that are less than or equal to a metric threshold;

means for receiving scheduling information scheduling one or more downlink transmissions for the first network node in one or more resources of the subset of resources indicated in the measurement report; and means for receiving, based on the scheduling information, the one or more downlink transmissions in the one or more resources of the subset of resources indicated in the measurement report.

30. A non-transitory computer-readable medium, comprising:

instructions that, when executed by one or more processors of a first network node, cause the first network node to:

perform a plurality of measurements on a plurality of resources allocated for uplink transmissions during a period of time, wherein the plurality of resources include resources allocated for at least one of scheduling request transmissions or random access channel transmissions; and transmit a measurement report based on the plurality of measurements, the measurement report indicating a subset of resources of the plurality of resources with statistical-based cross link interference (CLI) metrics that are less than or equal to a metric threshold receive scheduling information scheduling one or more downlink transmissions for the first network node in one or more resources of the subset of resources indicated in the measurement report; and receive, based on the scheduling information, the one or more downlink transmissions in the one or more resources of the subset of resources indicated in the measurement report.

* * * * *